(12) United States Patent
Eem Van Der et al.

(10) Patent No.: US 9,744,714 B2
(45) Date of Patent: *Aug. 29, 2017

(54) POLYETHYLENE FILM WITH HIGH TENSILE STRENGTH AND HIGH TENSILE ENERGY TO BREAK

(75) Inventors: Joris Eem Van Der, Arnhem (NL); Anton Peter De Weijer, Nijmegen (NL); Sanjay Rastogi, Eindhoven (NL)

(73) Assignee: TEIJIN ARAMID B.V., Arnhem (NL)

( * ) Notice: Subject to any disclaimer, the term of this patent is extended or adjusted under 35 U.S.C. 154(b) by 1206 days.

This patent is subject to a terminal disclaimer.

(21) Appl. No.: 13/144,038

(22) PCT Filed: Jan. 6, 2010

(86) PCT No.: PCT/EP2010/050063
§ 371 (c)(1),
(2), (4) Date: Jul. 11, 2011

(87) PCT Pub. No.: WO2010/079172
PCT Pub. Date: Jul. 15, 2010

(65) Prior Publication Data
US 2011/0268952 A1 Nov. 3, 2011

(30) Foreign Application Priority Data
Jan. 9, 2009 (EP) .................................... 09150305

(51) Int. Cl.
| | | |
|---|---|---|
| C08J 5/18 | (2006.01) |
| B29C 55/06 | (2006.01) |
| B29C 67/04 | (2017.01) |
| C08F 110/02 | (2006.01) |
| B29K 23/00 | (2006.01) |

(52) U.S. Cl.
CPC ............ B29C 55/065 (2013.01); B29C 67/04 (2013.01); C08F 110/02 (2013.01); C08J 5/18 (2013.01); B29K 2023/0683 (2013.01); C08J 2323/06 (2013.01)

(58) Field of Classification Search
CPC .................. B29C 55/065; B29C 67/04; B29K 2023/0683; C08F 110/02; C08F 2500/01; C08F 2500/03; C08F 2500/11; C08F 2500/26; C08F 2500/24; C08J 2323/06; C08J 5/18
USPC .......................................... 428/220; 264/175
See application file for complete search history.

(56) References Cited

U.S. PATENT DOCUMENTS

| | | |
|---|---|---|
| 4,344,908 A | 8/1982 | Smith et al. |
| 4,953,234 A | 9/1990 | Li et al. |
| 5,004,778 A | 4/1991 | Waagen et al. |
| 5,106,555 A | 4/1992 | Kobayashi et al. |
| 5,106,558 A | 4/1992 | Kobayashi et al. |
| 5,167,876 A | 12/1992 | Lem et al. |
| 5,284,411 A | 2/1994 | Enomoto et al. |
| 5,503,791 A | 4/1996 | Fortuin et al. |
| 5,578,373 A | 11/1996 | Kobayashi et al. |
| 5,650,451 A | 7/1997 | Yagi et al. |
| 5,756,660 A | 5/1998 | Shiraishi et al. |
| 6,017,480 A | 1/2000 | Yoshida et al. |
| 6,265,504 B1 | 7/2001 | Liu et al. |
| 6,794,033 B2 | 9/2004 | Morin et al. |
| 6,863,976 B2 | 3/2005 | Morin et al. |
| 6,951,685 B1 | 10/2005 | Weedon et al. |
| 7,671,159 B2 | 3/2010 | Rastogi et al. |
| 7,740,779 B2 | 6/2010 | Harding et al. |
| 7,964,266 B2 | 6/2011 | Harding et al. |
| 7,976,930 B2 | 7/2011 | Weedon et al. |
| 7,993,715 B2 | 8/2011 | Geva et al. |
| 8,197,935 B2 | 6/2012 | Bovenschen et al. |
| 2001/0053443 A1 | 12/2001 | Perez et al. |
| 2003/0127768 A1 | 7/2003 | Morin et al. |
| 2004/0267313 A1 | 12/2004 | Amery et al. |
| 2005/0091961 A1 | 5/2005 | Prickett |
| 2005/0121825 A1 | 6/2005 | Rastogi et al. |

(Continued)

FOREIGN PATENT DOCUMENTS

| | | |
|---|---|---|
| EP | 0 231 547 A1 | 8/1987 |
| EP | 0 269 151 A1 | 6/1988 |

(Continued)

OTHER PUBLICATIONS

Jog, J.P., Advances in Polymer Technology, 1993, John Wiley & Sons, Inc., vol. 12, No. 3, pp. 281-289.*
Rastogi, S., et al. "Heterogeneity in Polymer Melts from Melting of Polymer Crystals," Nature Materials, vol. 4, No. 8, Aug. 1, 2005, pp. 635-641.
PhD. Thesis of Lippits, D.R., "Controlling the melting kinetics of polymers; a route to a new melt state," Eindhoven University of Technology, Mar. 6, 2007, ISBN 978-90-386-0895-2.

(Continued)

Primary Examiner — Brian Handville
(74) Attorney, Agent, or Firm — Oliff PLC

(57) ABSTRACT

An UHMWPE film having a tensile strength of at least 2.0 GPa, a tensile energy to break of at least 30 J/g, an Mw of at least 500 000 gram/mole, and a Mw/Mn ratio of at most 6, and a film width of at least 5 mm. The film may be manufactured via a process which comprises subjecting a starting UHMWPE with a weight average molecular weight of at least 500 000 gram/mole, an elastic shear modulus determined directly after melting at 160° C. of at most 1.4 MPa, and a Mw/Mn ratio of at most 6 to a compacting step and a stretching step under such conditions that at no point during the processing of the polymer its temperature is raised to a value above its melting point. The film may be used as starting material in any applications where high tensile strength and high energy to break are important. Suitable applications include ballistic applications, ropes, cables, nets, fabrics, and protective applications.

15 Claims, No Drawings

(56) References Cited

U.S. PATENT DOCUMENTS

| | | | |
|---|---|---|---|
| 2006/0142521 A1 | 6/2006 | Rastogi et al. | |
| 2008/0251960 A1* | 10/2008 | Harding et al. | 264/119 |
| 2008/0287990 A1 | 11/2008 | Smit | |
| 2010/0144224 A1 | 6/2010 | De Weijer et al. | |
| 2011/0124835 A1 | 5/2011 | De Weijer et al. | |
| 2011/0268951 A1 | 11/2011 | Eem Van Der et al. | |

FOREIGN PATENT DOCUMENTS

| | | |
|---|---|---|
| EP | 0 292 074 A1 | 11/1988 |
| EP | 0 374 785 A1 | 6/1990 |
| EP | 0 874 005 A1 | 10/1998 |
| EP | 0 833 742 B1 | 9/2002 |
| EP | 1 746 187 A1 | 1/2006 |
| EP | 1 627 719 A1 | 2/2006 |
| EP | 2 014 445 A1 | 1/2009 |
| JP | A-06-010254 | 1/1994 |
| JP | A-8-26487 | 1/1996 |
| JP | A-2002-180324 | 6/2002 |
| WO | WO 86/05739 A1 | 10/1986 |
| WO | WO 91/12136 A1 | 8/1991 |
| WO | WO 97/00766 A1 | 1/1997 |
| WO | WO 01/21668 A1 | 3/2001 |
| WO | WO 2004/113057 A1 | 12/2004 |
| WO | WO 2006/107197 A1 | 10/2006 |
| WO | WO 2009/007045 A1 | 1/2009 |

OTHER PUBLICATIONS

International Search Report dated Mar. 16, 2010 in International Application No. PCT/EP2010/050063.
Written Opinion of the International Searching Authority dated Mar. 16, 2010 in International Application No. PCT/EP2010/050063.
Feb. 5, 2013 Office Action issued in U.S. Appl. No. 13/467,729.
Mitani et al., "Unprecedented Living Olefin Polymerization Derived from an Attractive Interaction between a Ligand and a Growing Polymer Chain," Chem. Eur. J., vol. 9, pp. 2396-2403, 2003.
Wang et al., "Rolling and Roll-Drawing of Ultrahigh Molecular Weight Polyethylene Reactor Powders," Journal of Applied Polymer Science, vol. 43, pp. 1559-1564, 1991.
van der Werff et al., "Tensile deformation of high strength and high modulus polyethylene fibers," Colloid Polymer Science, vol. 269, pp. 747-763, 1991.
Sep. 5, 2008 International Search Report and Written Opinion issued in International Application No. PCT/EP2008/005385.
Oct. 5, 2009 International Search Report and Written Opinion issued in International Application No. PCT/EP2009/058641.
Jul. 2, 2010 International Search Report and Written Opinion issued in International Application No. PCT/EP2010/050065.
Feb. 5, 2009 European Search Report issued in European Application No. 08160053.8.
Jun. 19, 2012 Office Action issued in U.S. Appl. No. 12/452,526.
U.S. Office Action dated Nov. 7, 2013 from U.S. Appl. No. 13/143,744.
Ihara et al., "Single site polymerization of ethylene and 1-olefins initiated by rare earth metal complexes," Macromol. Chem. Phys., vol. 197, pp. 1909-1917, 1996, Hüthig & Wepf Verlag, Zug.
Sep. 29, 2009 International Search Report issued in PCT/EP2009/058992.
Sep. 29, 2009 Written Opinion issued in PCT/EP2009/058992.
U.S. Appl. No. 13/467,729 filed in the name of Soon Joo Bovenschen et al. on May 9, 2012.
U.S. Appl. No. 13/054,618 filed in the name of Soon Joo Bovenschen et al. on Jan. 18, 2011.
U.S. Appl. No. 13/003,361 filed in the name of Anton Peter De. Weijer et al. on Jan. 10, 2011.
U.S. Appl. No. 13/143,744 filed in the name of Joris Eem Van Der et al. on Jul. 8, 2011.
U.S. Appl. No. 12/452,526 filed in the name of Anton Peter De Weijer et al. on Jan. 7, 2010.
Office Action issued Oct. 20, 2011 in U.S. Appl. No. 13/054,618.
Research Disclosure, RD 326076, published Jun. 10, 1991.
U.S. Office Action dated Oct. 9, 2013 from U.S. Appl. No. 13/003,361.
Third Party Submission dated Oct. 5, 2012 from Japanese Patent Application No. 2011-517906.
Office Action dated Dec. 1, 2014 issued in U.S. Appl. No. 12/452,526.
Mar. 3, 2016 Office Action issued in U.S. Appl. No. 12/452,526.
Jun. 1, 2015 Office Action issued in U.S. Appl. No. 12/452,526.

* cited by examiner

POLYETHYLENE FILM WITH HIGH TENSILE STRENGTH AND HIGH TENSILE ENERGY TO BREAK

BACKGROUND

In embodiments, the present invention pertains to a polyethylene film with high tensile strength and high tensile energy to break, and to a method for manufacturing such a film from a specific ultra high molecular weight polyethylene. In this document ultra high molecular weight polyethylene will further be indicated as UHMWPE.

Methods for manufacturing high-strength high-modulus UHMWPE films are known in the art.

U.S. Pat. No. 5,756,660 describes polymerisation of UHMWPE over a specific catalyst, followed by compression moulding, rolling and stretching to form a polymer film. In example 1, a material is obtained with a modulus of 160 GPa and a strength of 2.8 GPa.

U.S. Pat. No. 5,106,555 describes a method for compression molding/stretching of UHMWPE.

U.S. Pat. No. 5,503,791 describes a polyethylene film manufactured by extruding a solution of a polyolefin in a first solvent, followed by cooling, the removal of the solvent and stretching of the film. A disadvantage of the thus obtained film is that it always contains a certain amount of residual solvent, which may detrimentally affect the properties of the film. In general the amount of solvent present in solution of gel-cast films is at least 100 ppm. Further, the recovery of solvent is highly uneconomic.

EP 292 074 describes a method for processing polyolefins with a Mw of more than 400.000, in particular between 500.000 and 10.000.000, a low entanglement density, and a Mw/Mn of less than 10, preferably less than 5 at a temperature below the melting point of the polymer using a process auxiliary agent. The polyolefin is first compressed in the presence of a processing aid, and then subjected to solid state processing. The processing aids mentioned in this reference are polymer solvents. In the Example 17 wt. % of decaline is used.

EP 269 151 describes a material having a tensile strength above 2.0 GPa, a modulus above 70 GPa. and a creep below $3*10^{-7}$ sec$^{-1}$. This reference contains no information on the Mw/Mn ratio of the final product.

U.S. Pat. No. 5,106,558 describes a method for the continuous preparation of a polyethylene having high strength and high modulus which comprises the steps of mixing 100 parts by weight of an ultra-high molecular weight polyethylene powder having an intrinsic viscosity of 5-50 dl/g in decalin at 135° C. with 2-50 parts of a liquid organic compound having a boiling point higher than the melting point of polyethylene, feeding the resulting mixture between a pair of rollers, and subjecting the mixture to compression moulding and drawing. This reference contains no information on the Mw/Mn ratio of the final product.

U.S. Pat. No. 6,017,480 describes a process for producing polyolefin materials comprising the steps of preparing a molded article of UHMW polyolefin, stretching the article by more than 30-fold, contacting the article, and re-streching the article. This reference contains no information on the Mw/Mn ratio of the final product.

EP 2014445, which was filed before the priority date of the present application but published thereafter, describes a process for manufacturing polyethylene films. In embodiments, the present invention pertains to a UHMWPE film having a tensile strength of at least 2.0 GPa, a tensile energy to break of at least 30 J/g, an Mw of at least 500000 gram/mole, and a Mw/Mn ratio of at most 8. The film may be manufactured via a process which comprises subjecting a starting UHMWPE with a weight average molecular weight of at least 500000 gram/mole, an elastic modulus determined directly after melting at 160° C. of at most 0.9 MPa, and a Mw/Mn ratio of at most 8 to a compacting step and a stretching step under such conditions that at no point during the processing of the polymer its temperature is raised to a value above its equilibrium melting point.

SUMMARY

It has been found that there is still room for improvement in the field of high-tensile strength UHMWPE films. More in particular, there are numerous applications, including ballistic applications, ropes, cables, and nets, fabrics, and protective applications where PE films with high tensile energy to break, a high tensile strength, and other desirable properties will find application. In embodiments, the present invention provides such a UHMWPE film.

The UHMWPE film according to embodiments has a tensile strength of at least 2.0 GPa, a tensile energy to break of at least 30 J/g, an Mw of at least 500 000 gram/mole, and a Mw/Mn ratio of at most 6.

It has been found that the selection of a material with a Mw/Mn ratio of at most 6 in combination with a Mw of at least 500 000 is of importance to allow the final film to have the described high tensile strength and high energy to break in combination with further desirable properties, as will be discussed below. The materials described in U.S. Pat. Nos. 5,756,660, 5,106,555, and 5,503,791 do not meet all of the above criteria.

As indicated above, the UHMWPE film according to embodiments has a tensile strength of at least 2.0 GPa, determined in accordance with ASTM D882-00. Depending on the stretching ratio and stretching temperature, tensile strengths may be obtained of at least 2.5 GPA, in particular at least 3.0 GPa, more in particular at least 3.5 GPa. Tensile strengths of at least 4 GPa may also be obtained.

The tensile energy to break of the UHMWPE film according to embodiments is at least 30 J/g. The tensile energy to break is determined in accordance with ASTM D882-00 using a strain rate of 50%/min. It is calculated by integrating the energy per unit mass under the stress-strain curve.

The tensile energy to break may be approximated by the following methods. These will give a fair approximation of the tensile energy to break as it is to be determined in accordance with ASTM D882-00 as discussed above.

An approximation of the tensile energy to break may be obtained by integrating the total energy absorbed and dividing it by the mass of the original gage region of the specimen. In particular, since the stress-strain curve of UHMWPE samples with a tenacity over 2.0 GPa is approximately a straight line, the tensile energy to break can be calculated by the following formula $$TEB = \frac{\sigma}{\rho} * \frac{EAB}{2} * 10$$

in which sigma is the tensile strength in GPa according to ASTM D882-00, rho is density in g/cm3, EAB is the elongation at break, expressed as a percentage according to ASTM D882-00, and TEB is the tensile energy to break in J/g.

Another approximation of the tensile energy to break TEB can be derived from tensile modulus and tensile strength in accordance with the following formula;

$$TEB = \frac{\sigma^2}{2*Modulus*\rho}*10^3$$

Depending on the stretching ratio, films may be obtained according to embodiments which have a tensile energy to break of at least 35 J/g, in particular at least 40 J/g, more in particular at least 50 J/g.

The weight average molecular weight (Mw) of the polymer in the UHMWPE film of embodiments is at least 500 000 gram/mole in particular between $1.10^6$ gram/mole and $1.10^8$ gram/mole. The molecular weight distribution and molecular weigh averages (Mw, Mn, Mz) of the polymer are determined in accordance with ASTM D 6474-99 at a temperature of 160° C. using 1,2,4-trichlorobenzene (TCB) as solvent. Appropriate chromatographic equipment (PL-GPC220 from Polymer Laboratories) including a high temperature sample preparation device (PL-SP260) may be used. The system is calibrated using sixteen polystyrene standards (Mw/Mn <1.1) in the molecular weight range $5*10^3$ to $8*10^6$ gram/mole.

The molecular weight distribution may also be determined using melt rheometry. Prior to measurement, a polyethylene sample to which 0.5 wt % of an antioxidant such as IRGANOX 1010 has been added to prevent thermo-oxidative degradation, would first be sintered at 50° C. and 200 bars. Disks of 8 mm diameter and thickness 1 mm obtained from the sintered polyethylenes are heated fast (~30° C./min) to well above the equilibrium melting temperature in the rheometer under nitrogen atmosphere. For an example, the disk was kept at 180 C for two hours or more. The slippage between the sample and rheometer discs may be checked with the help of an oscilloscope. During dynamic experiments two output signals from the rheometer i.e. one signal corresponding to sinusoidal strain, and the other signal to the resulting stress response, are monitored continuously by an oscilloscope. A perfect sinusoidal stress response, which can be achieved at low values of strain was an indicative of no slippage between the sample and discs.

Rheometry may be carried out using a plate-plate rheometer such as Rheometrics RMS 800 from TA Instruments. The Orchestrator Software provided by the TA Instruments, which makes use of the Mead algorithm, may be used to determine molar mass and molar mass distribution from the modulus vs frequency data determined for the polymer melt. The data is obtained under isothermal conditions between 160-220° C. To get the good fit angular frequency region between 0.001 to 100 rad/s and constant strain in the linear viscoelastic region between 0.5 to 2% should be chosen. The time-temperature superposition is applied at a reference temperature of 190° C. To determine the modulus below 0.001 frequency (rad/s) stress relaxation experiments may be performed. In the stress relaxation experiments, a single transient deformation (step strain) to the polymer melt at fixed temperature is applied and maintained on the sample and the time dependent decay of stress is recorded.

DETAILED DESCRIPTION OF EMBODIMENTS

In one embodiment of the present invention, a polymer is used with the molar mass and Mw/Mn ratio as described above which can be compressed below its equilibrium melting temperature of 142° C., more in particular within the temperature range of 100-138° C., wherein the thus-obtained film can be drawn below the equilibrium meting temperature by more than 15 times its initial length.

The molecular weight distribution of the UHMWPE present in the film according to embodiments is relatively narrow. This is expressed by the Mw (weight average molecular weight) over Mn (number average molecular weight) ratio of at most 6. More in particular the Mw/Mn ratio is at most 4, still more in particular at most 3, even more in particular at most 2.

The modulus of the UHMWPE film according to embodiments is generally at least 80 GPa. The modulus is determined in accordance with ASTM D822-00. Depending on the stretching ratio, moduli may be obtained of at least 100, more in particular at least 120 GPa. It is possible to obtain moduli of at least 140 GPa, or at least 150 GPa.

In one embodiment of the present invention, the film according to the invention is characterised by a specific value for the uniplanar orientation parameter $\Phi$. The uniplanar orientation parameter $\Phi$ is defined as the ratio between the 200 and the 110 peak areas in the X-ray diffraction (XRD) pattern of the film sample as determined in reflection geometry.

Wide angle X-ray scattering (WAXS) is a technique that provides information on the crystalline structure of matter. The technique specifically refers to the analysis of Bragg peaks scattered at wide angles. Bragg peaks result from long-range structural order. A WAXS measurement produces a diffraction pattern, i.e. intensity as function of the diffraction angle $2\theta$ (this is the angle between the diffracted beam and the primary beam).

The uniplanar orientation parameter gives information about the extent of orientation of the 200 and 110 crystal planes with respect to the film surface. For a film sample with a high uniplanar orientation the 200 crystal planes are highly oriented parallel to the film surface. It has been found that the high tensile strength and high tensile energy to break of the film according to embodiments are generally accompanied by a high uniplanar orientation. The ratio between the 200 and 110 peak areas for a specimen with randomly oriented crystallites is around 0.4. However, the crystallites with indices 200 are preferentially oriented parallel to the film surface according to embodiments, resulting in a higher value of the 200/110 peak area ratio and therefore in a higher value of the uniplanar orientation parameter.

The value for the uniplanar orientation parameter may be determined using an X-ray diffractometer. A Bruker-AXS D8 diffractometer equipped with focusing multilayer X-ray optics (Göbel mirror) producing Cu-K$\alpha$ radiation (K wavelength=1.5418 Å) is suitable. Measuring conditions: 2 mm anti-scatter slit, 0.2 mm detector slit and generator setting 40 kV, 35 mA. The film specimen is mounted on a sample holder, e.g. with some double-sided mounting tape. The preferred dimensions of the film sample are 15 mm×15 mm (l×w). Care should be taken that the sample is kept perfectly flat and aligned to the sample holder. The sample holder with the film specimen is subsequently placed into the D8 diffractometer in reflection geometry (with the normal of the film perpendicular to the goniometer and perpendicular to the sample holder). The scan range for the diffraction pattern is from 5° to 40° (2θ) with a step size of 0.02° (2θ) and a counting time of 2 seconds per step. During the measurement the sample holder spins with 15 revolutions per minute around the normal of the film, so that no further sample alignment is necessary. Subsequently the intensity is measured as function of the diffraction angle 2θ. The peak area of the 200 and 110 reflections is determined using standard profile fitting software, e.g. Topas from Bruker-AXS. As the 200 and 110 reflections are single peaks, the fitting process is straightforward and it is within the scope of the skilled person to select and carry out an appropriate fitting procedure. The uniplanar orientation parameter is defined as the ratio between the 200 and 110 peak areas. This parameter is a quantitative measure of the uniplanar orientation.

The high uniplanar orientation parameter is also related to the Mw/Mn ratio, in that polymers with a Mw/Mn ratio within the range specified in the present invention can be converted into films with a desirable value for the uniplanar orientation parameter. As indicated above, in one embodiment, the film according to the invention has a uniplanar orientation parameter of at least 3. It may be preferred for this value to be at least 4, more in particular at least 5, or at least 7. Higher values, such as values of at least 10 or even at least 15 may also be obtained. The theoretical maximum value for this parameter may be as high as infinite if the peak area 110 equals zero. High values for the uniplanar orientation parameter are often accompanied by high values for the strength and the energy to break.

The UHMWPE film according to embodiments may be manufactured by a process which comprises subjecting a starting UHMWPE with a weight average molecular weight of at least 500 000 gram/mole, an elastic shear modulus $G_N^0$, determined directly after melting at 160° C. of at most 1.4 MPa, and a Mw/Mn ratio of at most 6 to a compacting step and a stretching step under such conditions that at no point during the processing of the polymer its temperature is raised to a value above its melting point.

The starting material of the process according to embodiments is a highly disentangled UHMWPE. This can be seen from the combination of the weight average molecular weight, the Mw/Mn ratio, the elastic shear modulus, and the fact that the elastic shear modulus of the material increases after first melting.

For further elucidation and preferred embodiments as regards the molecular weight and the Mw/Mn ratio of the starting UHMWPE, reference is made to what has been stated above for the film according to embodiments.

As indicated above, the starting UHMWPE has an elastic shear modulus $G_N^0$ determined directly after melting at 160° C. of at most 1.4 MPa, more in particular at most 1.0 MPa, still more in particular at most 0.9 MPa, even more in particular at most 0.8 MPa, and even more in particular at most 0.7. The wording "directly after melting" means that the elastic shear modulus is determined as soon as the polymer has melted, in particular within 15 seconds after the polymer has melted. For this polymer melt $G_N^0$ typically increases from 0.6 to 2.0 MPa in one, two, or more hours, depending on the molar mass. The elastic shear modulus directly after melting at 160° C. is one of the characterising features of the very disentangled UHMWPE used in the present invention.

$G_N^0$ is the elastic shear modulus in the rubbery plateau region. It is related to the average molecular weight between entanglements Me, which in turn is inversely proportional to the entanglement density. In a thermodynamically stable melt having a homogeneous distribution of entanglements, Me can be calculated from $G_N^0$ via the formula $G_N^0 = g_N \rho RT/M_e$, where $g_N$ is a numerical factor set at 1, rho is the density in g/cm3, R is the gas constant and T is the absolute temperature in K.

A low elastic shear modulus thus stands for long stretches of polymer between entanglements, and thus for a low degree of entanglement. The adopted method for the investigation on changes in $G_N^0$ with the entanglements formation is the same as described in publications (Rastogi, S., Lippits, D., Peters, G., Graf, R., Yefeng, Y. and Spiess, H., "Heterogeneity in Polymer Melts from Melting of Polymer Crystals", Nature Materials, 4(8), 1 Aug. 2005, 635-641 and PhD thesis Lippits, D. R., "Controlling the melting kinetics of polymers; a route to a new melt state", Eindhoven University of Technology, dated 6 Mar. 2007, ISBN 978-90-386-0895-2).

In one embodiment a polymer is used which shows a strain hardening slope of below 0.10 N/mm at 135° C. and/or of below 0.12 N/mm at 125° C. The strain hardening slope is determined by subjecting compressed polymer to a drawing step under specific conditions.

The test is carried out as follows: polymer powder is subjected to compaction at a pressure of 200 bar, at 130° C., for 30 minutes to form tensile bars with a thickness of 1 mm, a width of 5 mm and a length of 15 mm. The bars are subjected to drawing at a tensile speed of 100 mm/min at a temperature of 125° C. or 135° C. The drawing temperature is chosen such that no melting of the polymer occurs. The bar is drawn from 10 mm to 400 mm.

For the tensile test a force cell of 100N is used. The force cell measures force required for the elongation of the sample at the fixed temperature. The force/elongation curve shows a first maximum, which is also known as the yield point. The strain hardening slope is defined as the steepest positive slope in the force/elongation curve after the yield point. In one embodiment of the present invention, the polymer has a strain hardening slope, determined at 135° C., of below 0.10 N/mm, in particular below 0.06 N/mm, more in particular below 0.03 N/mm. In another embodiment, the polymer has a strain hardening slope, determined at 125° C., of below 0.12 N/mm, in particular below 0.08 N/mm, more in particular below 0.03 N/mm. In a preferred embodiment, the polymer meets the stipulated requirements both at 125° C. and at 135° C.

While not wishing to be bound by theory, a low strain hardening slope means that the material has high drawability at low stress. It is believed that this means in turn that the polymer chains contain few entanglements, and that this will enable the manufacture of tape with good properties in accordance with the embodiments.

The UHMWPE used in the process according to embodiments preferably has a DSC crystallinity of at least 74%, more in particular at least 80%. The morphology of the films may be characterised using differential scanning calorimetry (DSC), for example on a Perkin Elmer DSC7. Thus, a sample of known weight (2 mg) is heated from 30 to 180° C. at 10° C. per minute, held at 180° C. for 5 minutes, cooled at 10° C. per minute. The results of the DSC scan may be plotted as a graph of heat flow (mW or mJ/s; y-axis) against temperature (x-axis). The crystallinity is measured using the data from the heating portion of the scan. An enthalpy of fusion $\Delta H$ (in J/g) for the crystalline melt transition is calculated by determining the area under the graph from the temperature determined just below the start of the main melt transition (endotherm) to the temperature just above the point where fusion is observed to be completed. The calculated $\Delta H$ is then compared to the theoretical enthalpy of fusion ($\Delta H_c$ of 293 J/g) determined for 100% crystalline PE at a melt temperature of approximately 140° C. A DSC crystallinity index is expressed as the percentage 100 ($\Delta H/\Delta H_c$).

The film in accordance with embodiments and the intermediate products of the manufacturing process according to embodiments preferably also have crystallinities as indicated above.

The UHMWPE used in embodiments may have a bulk density which is significantly lower than the bulk density of conventional UWMWPEs. More in particular, the UHMWPE used in the process according to the invention may have a bulk density below 0.25 g/cm$^3$, in particular below 0.18 g/cm$^3$, still more in particular below 0.13 g/cm$^3$. The bulk density may be determined in accordance with ASTM-D1895. A fair approximation of this value can be obtained as follows. A sample of UHMWPE powder is poured into a measuring beaker of exact 100 ml. After scraping away the surplus of material, the weight of the content of the beaker is determined and the bulk density is calculated.

The UHMWPE used in the process according to embodiments can be a homopolymer of ethylene or a copolymer of ethylene with a co-monomer which is another alpha-olefin or a cyclic olefin both with generally between 3 and 20 carbon atoms. Examples include propene, 1-butene, 1-pentene, 1-hexene, 1-heptene, 1-octene, cyclohexene, etc. The use of dienes with up to 20 carbon atoms is also possible, e.g., butadiene or 1-4 hexadiene. The amount of (non-ethylene) alpha-olefin in the ethylene homopolymer or copolymer used in the process according to the invention preferably is at most 10 mole %, preferably at most 5 mole %, more preferably at most 1 mole %. If a (non-ethylene) alpha-olefin is used, it is generally present in an amount of at least 0.001 mol. %, in particular at least 0.01 mole %, still more in particular at least 0.1 mole %. Obviously, the ranges given above for the starting material also apply to the final polymer film.

The starting polymer for use in embodiments may be manufactured by a polymerisation process wherein ethylene, optionally in the presence of other monomers as discussed above, is polymerised in the presence of a single-site polymerisation catalyst at a temperature below the crystallisation temperature of the polymer, so that the polymer crystallises immediately upon formation. In particular, reaction conditions are selected such that the polymerisation speed is lower than the crystallisation speed. These synthesis conditions force the molecular chains to crystallize immediately upon their formation, leading to a rather unique morphology which differs substantially from the one obtained from the solution or the melt. The crystalline morphology created at the surface of a catalyst will highly depend on the ratio between the crystallization rate and the growth rate of the polymer. Moreover, the temperature of the synthesis, which is in this particular case also crystallization temperature, will strongly influence the morphology of the obtained UHMW-PE powder. In one embodiment the reaction temperature is between −50 and +50° C., more in particular between −15 and +30° C. It is well within the scope of the skilled person to determine via routine trial and error which reaction temperature is appropriate in combination with which type of catalyst, polymer concentrations and other parameters influencing the reaction.

To obtain a highly disentangled UHMWPE it is important that the polymerisation sites are sufficiently far removed from each other to prevent entangling of the polymer chains during synthesis. This can be done using a single-site catalyst which is dispersed homogenously through the crystallisation medium in low concentrations. More in particular, concentrations less than 1.10-4 mol catalyst per liter, in particular less than 1.10-5 mol catalyst per liter reaction medium may be appropriate. Supported single site catalyst may also be used, as long as care is taken that the active sites are sufficiently far removed from each other to prevent substantial entanglement of the polymers during formation.

Suitable methods for manufacturing starting UHMWPE used in embodiments are known in the art. Reference is made, for example to WO01/21668 and US20060142521.

The polymer is provided in particulate form, for example in the form of a powder, or in any other suitable particulate form. Suitable particles have a particle size of up to 5000 micron, preferably up to 2000 micron, more in particular up to 1000 micron. The particles preferably have a particle size of at least 1 micron, more in particular at least 10 micron.

The particle size distribution may be determined by laser diffraction (PSD, Sympatec Quixel) as follows. The sample is dispersed into surfactant-containing water and treated ultrasonic for 30 seconds to remove agglomerates/entanglements. The sample is pumped through a laser beam and the scattered light is detected. The amount of light diffraction is a measure for the particle size.

The compacting step is carried out to integrate the polymer particles into a single object, e.g., in the form of a mother sheet. The stretching step is carried out to provide orientation to the polymer and manufacture the final product. The two steps are carried out at a direction perpendicular to each other. It is noted that it is within the scope of embodiments to combine these elements in a single step, or to carry out the process in different steps, each step performing one or more of the compacting and stretching elements. For example, in one embodiment of the process according to the invention, the process comprises the steps of compacting the polymer powder to form a mothersheet, rolling the plate to form rolled mothersheet and subjecting the rolled mothersheet to a stretching step to form a polymer film. The compacted material has a polymer solvent content of less than 0.05 wt. %, in particular less than 0.025 wt. %, more in particular less than 0.01 wt. %.

The compacting force applied in the process according to the invention generally is 10-10000 N/cm$^2$, in particular 50-5000 N/cm2, more in particular 100-2000 N/cm$^2$. The density of the material after compacting is generally between 0.8 and 1 kg/dm$^3$, in particular between 0.9 and 1 kg/dm$^3$.

In the process according to embodiments the compacting and rolling step is generally carried out at a temperature of at least 1° C. below the unconstrained melting point of the polymer, in particular at least 3° C. below the unconstrained melting point of the polymer, still more in particular at least 5° C. below the unconstrained melting point of the polymer. Generally, the compacting step is carried out at a temperature of at most 40° C. below the unconstrained melting point of the polymer, in particular at most 30° C. below the unconstrained melting point of the polymer, more in particular at most 10° C.

In the process according to embodiments the stretching step is generally carried out at a temperature of at least 1° C. below the melting point of the polymer under process conditions, in particular at least 3° C. below the melting point of the polymer under process conditions, still more in particular at least 5° C. below the melting point of the polymer under process conditions. As the skilled person is aware, the melting point of polymers may depend upon the constraint under which they are put. This means that the melting temperature under process conditions may vary from case to case. It can easily be determined as the temperature at which the stress tension in the process drops sharply. Generally, the stretching step is carried out at a temperature of at most 30° C. below the melting point of the polymer under process conditions, in particular at most 20° C. below the melting point of the polymer under process conditions, more in particular at most 15° C.

In one embodiment of the present invention, the stretching step encompasses at least two individual stretching steps, wherein the first stretching step is carried out at a lower temperature than the second, and optionally further, stretching steps. In one embodiment, the stretching step encompasses at least two individual stretching steps wherein each further stretching step is carried out at a temperature which is higher than the temperature of the preceding stretching step.

As will be evident to the skilled person, this method can be carried out in such a manner that individual steps may be identified, e.g., in the form of the films being fed over individual hot plates of a specified temperature. The method can also be carried out in a continuous manner, wherein the film is subjected to a lower temperature in the beginning of the stretching process and to a higher temperature at the end of the stretching process, with a temperature gradient being applied in between. This embodiment can for example be carried out by leading the film over a hot plate which is equipped with temperature zones, wherein the zone at the end of the hot plate nearest to the compaction apparatus has a lower temperature than the zone at the end of the hot plate furthest from the compaction apparatus.

In one embodiment, the difference between the lowest temperature applied during the stretching step and the highest temperature applied during the stretching step is at least 3° C., in particular at least 7° C., more in particular at least 10° C. In general, the difference between the lowest temperature applied during the stretching step and the highest temperature applied during the stretching step is at most 30° C., in particular at most 25° C.

The unconstrained melting temperature of the starting polymer is between 138 and 142° C. and can easily be determined by the person skilled in the art. With the values indicated above this allows calculation of the appropriate operating temperature. The unconstrained melting point may be determined via DSC (differential scanning calorimetry) in nitrogen, over a temperature range of +30 to +180° C. and with an increasing temperature rate of 10° C./minute. The maximum of the largest endothermic peak at from 80 to 170° C. is evaluated here as the melting point.

In the conventional processing of UHMWPE it was necessary to carry out the process at a temperature which was very close to the melting temperature of the polymer, e.g., within 1 to 3 degrees therefrom. It has been found that the selection of the specific starting UHMWPE used in the process according to embodiments makes it possible to operate at values which are more below the melting temperature of the polymer than has been possible in the prior art. This makes for a larger temperature operating window which makes for better process control.

It has also been found that, as compared to conventional processing of UHMWPE, materials with a strength of at least 2 GPa can be manufactured at higher deformation speeds. The deformation speed is directly related to the production capacity of the equipment. For economical reasons it is important to produce at a deformation rate which is as high as possible without detrimentally affecting the mechanical properties of the film. In particular, it has been found that it is possible to manufacture a material with a strength of at least 2 GPa by a process wherein the stretching step that is required to increase the strength of the product from 1.5 GPa to at least 2 GPa is carried out at a rate of at least 4% per second. In conventional polyethylene processing it is not possible to carry out this stretching step at this rate. While in conventional UHMWPE processing the initial stretching steps, to a strength of, say, 1 or 1.5 GPa may be carried out at a rate of above 4% per second, the final steps, required to increase the strength of the film to a value of 2 GPa or higher, must be carried out at a rate well below 4% per second, as otherwise the film will break. In contrast, in the process according to embodiments it has been found that it is possible to stretch intermediate film with a strength of 1.5 GPa at a rate of at least 4% per second, to obtain a material with a strength of at least 2 GPa. For further preferred values of the strength reference is made to what has been stated above. It has been found that the rate applied in this step may be at least 5% per second, at least 7% per second, at least 10% per second, or even at least 15% per second.

The strength of the film is related to the stretching ratio applied. Therefore, this effect can also be expressed as follows. In one embodiment of the invention, the stretching step of the process according to the invention can be carried out in such a manner that the stretching step from a stretching ratio of 80 to a stretching ratio of at least 100, in particular at least 120, more in particular at least 140, still more in particular of at least 160 is carried out at the stretching rate indicated above.

In still a further embodiment, the stretching step of the process according to the invention can be carried out in such a manner that the stretching step from a material with a modulus of 60 GPa to a material with a modulus of at least at least 80 GPa, in particular at least 100 GPa, more in particular at least 120 GPa, at least 140 GPa, or at least 150 GPa is carried out at the rate indicated above.

In will be evident to the skilled person that the intermediate products with a strength of 1.5 GPa, a stretching ratio of 80, and/or a modulus of 60 GPa are used, respectively, as starting point for the calculation of when the high-rate stretching step starts. This does not mean that a separately identifiable stretching step is carried out where the starting material has the specified value for strength, stretching ratio, or modulus. A product with these properties may be formed as intermediate product during a stretching step. The stretching ratio will then be calculated back to a product with the specified starting properties. It is noted that the high stretching rate described above is dependent upon the requirement that all stretching steps, including the high-rate stretching step or steps are carried out at a temperature below the melting point of the polymer under process conditions.

Conventional apparatus may be used to carry out the compacting step. Suitable apparatus include heated rolls, endless belts, etc.

The stretching step in the process according to embodiments is carried out to manufacture the polymer film. The stretching step may be carried out in one or more steps in a manner conventional in the art. A suitable manner includes leading the film in one or more steps over a set of rolls both rolling in process direction wherein the second roll rolls faster that the first roll. Stretching can take place over a hot plate or in an air circulation oven. In general it is difficult to control the temperature of this type of equipment within 1 degree, which will allow the skilled person to appreciate the broadened operating window provided by the process.

It is one of the features of the present invention that the total stretching ratio of the film can be very high indeed. For example, the total stretching ratio may be at least 120, in particular at least 140, more in particular at least 160. The total draw ratio is defined as the area of the cross-section of the compacted mothersheet divided by the cross-section of the drawn film produced from this mothersheet.

The process according to embodiments is carried out in the solid state. The final polymer film has a polymer solvent content of less than 0.05 wt. %, in particular less than 0.025 wt. %, more in particular less than 0.01 wt. %.

The film according to embodiments is a three-dimensional object which is characterised in that two of its dimensions are substantially larger than the third. More in particular, the ratio between the second smallest dimension, the width of the film, and the smallest dimension, the thickness of the film, is at least 10, in particular at least 50.

The width of the film is generally at least 5 mm, in particular at least 10 mm, more in particular at least 20 mm, still more in particular at least 40 mm. The width of the film is generally at most 200 mm. The thickness of the film is generally at least 8 microns, in particular at least 10 microns. The thickness of the film is generally at most 150 microns, more in particular at most 100 microns.

In embodiments, the present invention makes it possible to obtain films with a high strength, as described above, in combination with a high linear density. In the present application the linear density is expressed in dtex. This is the weight in grams of 10.000 metres of film. In one embodiment, the film according to the invention has a denier of at least 3000 dtex, in particular at least 5000 dtex, more in particular at least 10000 dtex, even more in particular at least 15000 dtex, or even at least 20000 dtex, in combination with strengths of, as specified above, at least 2.0 GPa, in particular at least 2.5 GPA, more in particular at least 3.0 GPa, still more in particular at least 3.5 GPa, and even more in particular at least 4.

The polymer film or the converted products thereof according to embodiments can be used as starting material for numerous applications, including ballistic applications, ropes, cables, nets, fabrics, and protective applications.

Ballistic attributes, ropes, cables, nets, fabrics, and protective appliances derived from the UHMWPE film according to embodiments are also part of the present invention.

The invention claimed is:

1. An UHMWPE film having a tensile strength of at least 2.0 GPa, a tensile energy to break of at least 30 J/g, an Mw of at least 500,000 gram/mole, and a Mw/Mn ratio of at most 6, and a film width of at least 5 mm, wherein the UHMWPE film is made from an UHMWPE particle having an elastic shear modulus determined directly after melting at 160° C. of at most 1.0 MPa, wherein the UHMWPE film is made by a solid state process under such conditions that at no point during the solid state process is a temperature of the UHMWPE raised above an equilibrium melting point of the UHMWPE, and wherein the UHMWPE is produced in the presence of a single-site polymerization catalyst that is present at a concentration of less than $1 \times 10^{-4}$ mol catalyst per liter reaction medium.

2. The UHMWPE film of claim 1 which has a tensile strength of at least 2.5 GPa.

3. The UHMWPE film of claim 1 which has a tensile energy to break of at least 35 J/g.

4. The UHMWPE film of claim 1 which has a Mw/Mn ratio of at most 4.

5. The UHMWPE film of claim 1 which has a uniplanar orientation parameter of at least 3.

6. The UHMWPE film of claim 1 which has an organic solvent content of less than 100 ppm.

7. The UHMWPE film of claim 1, wherein the film has a width of at least 10 mm and a denier of at least 3000 dtex.

8. A solid state process for manufacturing the UHMWPE film according to claim 1 comprising:
compacting and stretching an UHMWPE, wherein the UHMWPE, before compacting and stretching, is in particular form and has a weight average molecular weight of at least 500 000 gram/mole, an elastic shear modulus determined directly after melting at 160° C. of at most 1.0 MPa, and a Mw/Mn ratio of at most 6, and at no point during the solid state process is a temperature of the UHMWPE raised above an equilibrium melting point of the UHMWPE.

9. The process of claim 8 wherein the starting UHMWPE has an elastic shear modulus determined directly after melting at 160° C. of at most 0.8 MPa.

10. The process of claim 8 wherein compacting is carried out at a temperature of at least 1° C. below the unconstrained melting point of the polymer, and stretching is carried out at a temperature of at least 1° C. below the melting point of the polymer under process conditions.

11. The process of claim 8, wherein the stretching encompasses at least two individual stretching steps, wherein the first stretching step is carried out at a lower temperature than the second, and optionally further stretching steps, wherein each further stretching step is carried out at a temperature which is higher than the temperature of the preceding stretching step.

12. The process of claim 8, wherein a total stretching ratio obtained is at least 120.

13. The process of claim 8, wherein
stretching increases the strength of the product from 1.5 GPa to at least 2 GPa and is carried out at a rate of at least 4% per second,
stretching from a stretching ratio of 80 to a stretching ratio of at least 100 is carried out at a rate of at least 4% per second, or
stretching from a material with a modulus of 60 GPa to a material with a modulus of at least at least 80 GPa is carried out at a rate of at least 4% per second.

14. The UHMWPE film of claim 1, wherein the film is used as a starting material for ballistic materials, ropes, cables, nets, fabrics, and protective appliances.

15. The UHMWPE film of claim 1, wherein the film is used in the manufacture of ballistic materials, ropes, cables, nets, fabrics, and protective appliances.

* * * * *